May 12, 1970  KATUJI YASIRO  3,511,107
PARKING BRAKE CONTROL DEVICES
Filed Feb. 16, 1968  2 Sheets-Sheet 1
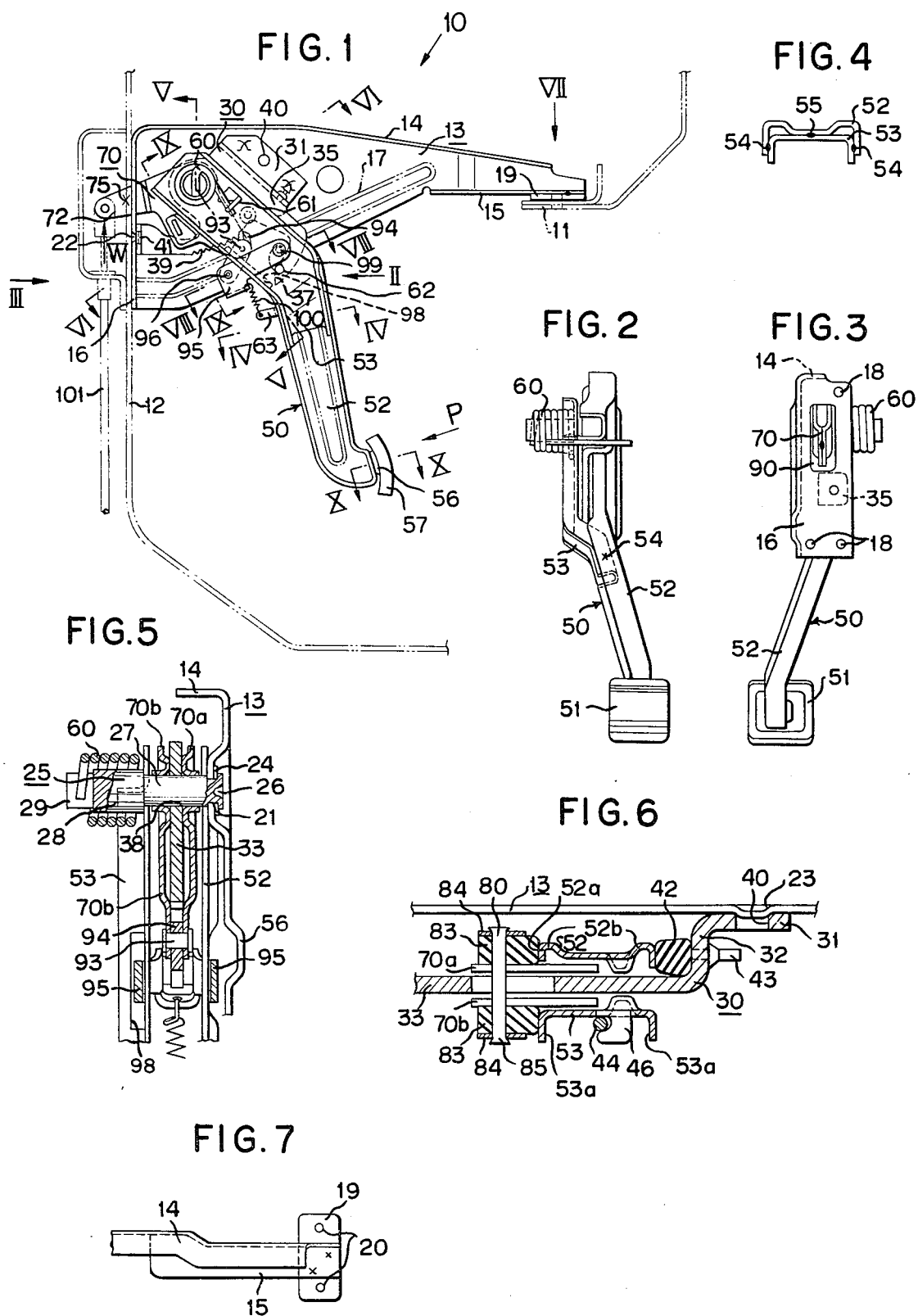

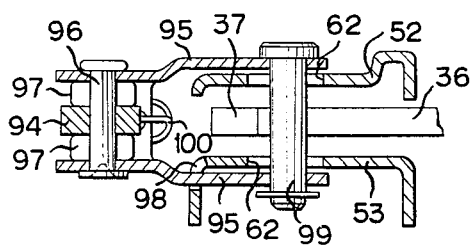
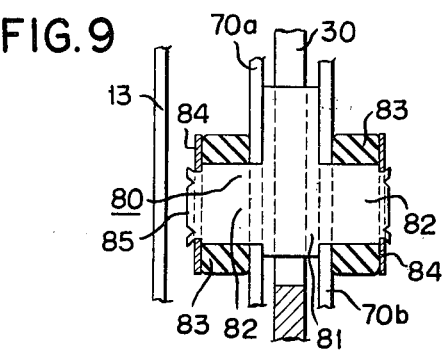
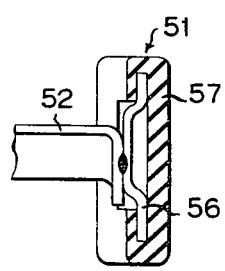
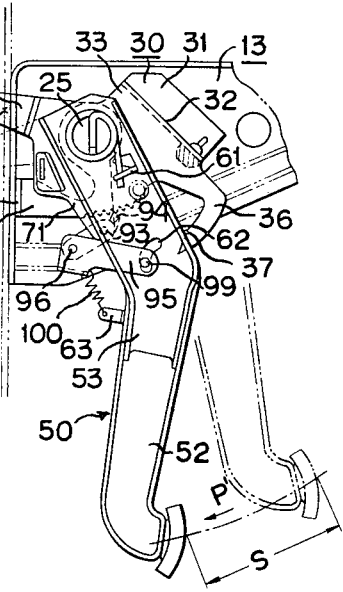
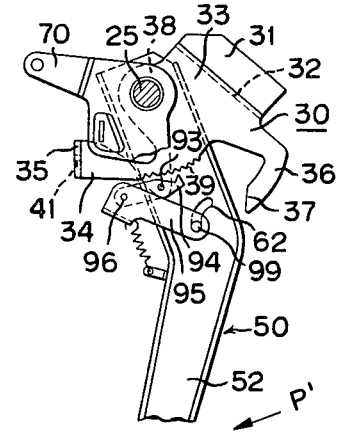
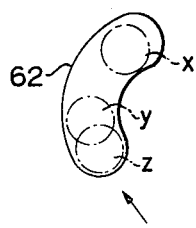
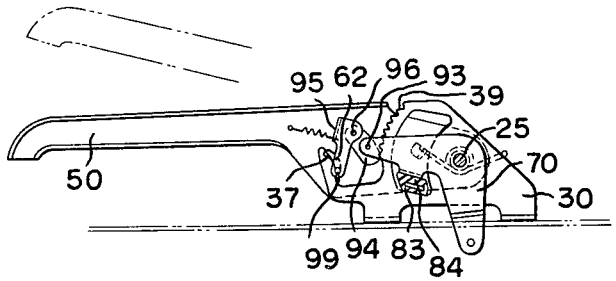
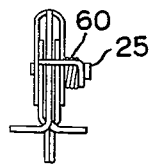

United States Patent Office 3,511,107
Patented May 12, 1970

3,511,107
PARKING BRAKE CONTROL DEVICES
Katuji Yasiro, Yokohama-shi, Japan, assignor to Otsuka-koki Kabushiki Gaisha, Yokohama-shi, Kanagawa-ken, Japan
Filed Feb. 16, 1968, Ser. No. 706,077
Int. Cl. G05g 1/14
U.S. Cl. 74—512                                   4 Claims

ABSTRACT OF THE DISCLOSURE

A parking brake control device for motor vehicles comprises a pedal arm adapted to be depressed with foot, a bell-crank lever adapted to be turned by the pedal arm to transmit the braking force, and a pawl pivotally mounted on said bell-crank lever for engagement with and disengagement from a series of stationary teeth. Depression of the pedal arm causes the pawl to engage the teeth to hold the bell-crank lever in braking position and next depression of the pedal arm causes the pawl to be disengaged from the teeth to permit the bell-crank lever to return to brake releasing position.

---

This invention relates to brake control devices and, more particularly, to parking brake control devices for motor vehicles.

In the heretofore used foot-operated parking-brake control devices, brake applying operation is performed by depressing the brake pedal with the foot, while releasing the brake must be performed by manually operating a separate mechanism, for example, by manually pulling a brake releasing knob. Such brake control devices are therefore troublesome in operation but nevertheless complicated in construction.

A main object of this invention is to provide a novel parking brake control device which only requires a re-operation of the same brake pedal as was used to apply the brake, in order to release braking.

Another object of this invention is to provide a foot operable brake control device of the above type which is reliable in operation and relatively simple in construction.

Still another object of this invention is to provide a manually operable brake control device of the above type.

These and other objects and advantages of this invention will become more apparent as the description proceeds with reference to the accompanying drawings, in which:

FIG. 1 is a side view showing a foot operable type parking brake control device in accordance with the invention, the device being in a releasing condition;

FIG. 2 is a view as seen in the direction of the arrow II of FIG. 1;

FIG. 3 is a view as seen in the direction of the arrow III of FIG. 1;

FIG. 4 is a section taken along the line IV—IV of FIG. 1;

FIG. 5 is a fragmentary section taken along the line V—V of FIG. 1;

FIG. 6 is a fragmentary section taken along the line VI—VI of FIG. 1;

FIG. 7 is a fragmentary plan view as seen from the arrow VII of FIG. 1;

FIG. 8 is a section taken along the line VIII—VIII of FIG. 1;

FIG. 9 is a fragmentary section taken along the line IX—IX of FIG. 1;

FIG. 10 is a section taken along the line X—X of FIG. 1;

FIG. 11 is a fragmentary side view similar to FIG. 1 but showing the device in a condition where a pedal arm is freed from the foot operator after it has been depressed;

FIG. 12 is a fragmentary side view somewhat similar to FIG. 11 but showing the device without bracket 13 and in a condition where the pedal arm has been depressed again for brake releasing;

FIG. 13 is a side view of a bell-crank lever;

FIG. 14 is an enlarged view showing three positions of a link pin relative to the L-shaped slot;

FIG. 15 is the side view showing the modification of the parking brake control device; and FIG. 16 is a right end view of the device of FIG. 15.

Referring now to the drawings, a parking brake control assembly is generally designated by the reference numeral 10 in FIG. 1 and is rigidly carried in position by means of an extension 11 of the instrument board and of a dashpanel 12, which are shown in dot and dash lines in FIG. 1. More specifically, the control assembly 10 includes a mounting frame 13 having upper, lower and front flanges 14, 15 and 16. These flanges and a bead 17 formed in the frame 13 serve to increase the rigidity of the latter. Among the flanges, the front flange 16 has therein holes 18 (FIG. 3) for bolting the flange 16 to the dashpanel 12 and the lower flange 15 has welded thereto a mounting plate 19 with holes 20 (FIG. 7) for bolting the plate to the extension 11 of the instrument board. The mounting frame 13 further includes an opening 21 (FIG. 5) for accommodating a main pivot pin 25 and also includes at least a pair of embossed portions 22 (FIG. 1) and 23 (FIG. 6) which purpose will be explained later. A washer 24 is rigidly secured to the frame 13, as by spot welding, adjacent the opening 21 as shown in FIG. 5.

As also shown in FIG. 5, the main pivot pin 25 comprises a first or holding section 26 of the smallest diameter, an inner second section 27 of a larger diameter, and a middle or third section 28 of the largest diameter off which a slotted end section extends. The first section 26 is inserted in the opening 21 of the mounting frame 13 and rigidly connected to the latter as by forming a head. The end section off 28 is formed with a diametrically extending slot 29.

A sector member 30 is rigidly carried on one side of the mounting frame 13 as shown in FIGS. 1, 11 and 12. As most clearly shown in FIG. 12, the member 30 comprises a mounting flange 31, an upstanding wall 32, a toothed panel 33 extending parallel to the mounting flange 31, an extension 34 extending from the toothed panel 33 and terminating in a mounting flange 35, and a generally L-shaped extension 36 extending from the toothed panel 33 and terminating in a slanted guide edge 37. As shown in FIGS. 5 and 12, the toothed panel 33 is formed with an opening 38 through which the main pivot pin 25 passes and also with a series of teeth 39, on a center common to that of the main pivot pin 25. The mounting flange 31 is formed with an opening 40 adapted to receive therein the said embossed portion 23 of the mounting frame 13 as is most clearly shown in FIG. 6. Similarly, the mounting flange 35 is formed with an opening 41 adapted to receive therein the said embossed portion 22 of the mounting frame 13. Thus, the openings 40 and 41 and the embossed portions 22 and 23 cooperate for quick positioning of the sector member 30 with respect to the mounting frame 13. After placing the sector member 30 in position, both the flanges 31 and 35 are welded to the mounting frame 13. In the assembled condition of the sector member 30, the tooth panel 33 extends in spaced and parallel relationship to the mounting frame 13. The teeth 39 of the sector member may be heat-treated in order to produce a wear-resistant hardened layer thereon. The inner side of the upstanding wall 32 of the sector member has a bumper 42 rigidly secured thereto by any suitable means such as a member 43. The bumper 42 may be a mass of rubber, for example.

The aforementioned main pivot pin 25, when the sector member 30 has been rigidly secured to the mounting frame 13, is rigidly held in position. Since the main pivot pin 25 serves to support important elements of this invention as will be hereinafter described, it must be highly wear-resistant and must have long life. For this purpose, the portion of the main pivot pin 25 to be subjected to wear should be hardened by heat-treatment.

On the main pivot pin 25 is pivotally carried the base end of a parking brake pedal arm 50 carrying a treadle 51 on the free end. The pedal arm 50 comprises a main arm 52 of a channel-like cross-section and a sub-arm 53 of a similar channel-like cross-section, both the arms 52 and 53 being welded at 54 and 55 as shown in FIGS. 2 and 4. The free end of the main arm 52 has a treadle plate 56 rigidly secured thereto as by welding (FIG. 10), which treadle plate 56 is supplied with a treadle rubber 57. The main arm 52 and the sub-arm 53 extend in spaced parallel relationship to each other toward the base ends thereof and have aligned respective openings at those ends through which said main pivot pin 25 passes as shown in FIG. 5. Once the pedal arm 50 has been pivoted on the main pivot pin 25, it cannot get out of position with respect to the axial direction of the pin 25 because any axial displacement of the arm 50 will be prevented by the enlarged third section 28 of the main pivot pin 25. A return coil spring 60 is provided around the third section 28 of the pin 25 with one end of the spring 60 inserted in the diametrical slot 29 and with another end of the same engaging an ear 61 bent out from the material of the sub-arm 53. Thus, it will be noted that the parking brake pedal arm 50 is always resiliently urged by the spring 60 in an anti-clockwise direction as viewed in FIGS. 1, 11 and 12. The main arm 52 and sub-arm 53 of the pedal arm 50 are formed with respective L-shaped guide slots 62, which are mutually registered to receive a pin as will be described later. The pedal arm 50 is also provided with a spring retaining lug 63. The main arm 52 and sub-arm 53 are formed with longitudinal flanges 52a and 53a, respectively, as shown in FIG. 6. The main arm 52 is further formed with longitudinal beads 52b for increasing the rigidity thereof.

On the main pivot pin 25 is pivotally mounted a bellcrank lever 70 composed of a pair of identical bellcrank lever plates 70a and 70b. Each of the lever plates 70a and 70b is shaped as shown in FIG. 13 and consists of a first arm 71, a second arm 72, and an enlarged medium portion 73 formed with an opening 74 through which the main pivot pin 25 passes. The first arms 71 and the medium portions 73 of both the lever plates 70a and 70b extend in spaced parallel relationship to each other while the remaining second arms 72 are in face to face relationship and are suitably welded to each other as shown at 75 in FIGS. 1 and 11. The bellcrank lever plates 70a and 70b, in the condition of being mounted on the main pivot pin 25, are in such a relative position with respect to the main pedal arm 52 and sub-arm 53 and to the toothed panel 33 of the sector member 30 that the lever plates 70a and 70b are located between the main arm 52 and the sub-arm 53 with the toothed panel 33 interposed between the lever plates 70a and 70b (see FIG. 5). Annular flanges formed along the peripheries of the opening 74 of the bellcrank lever plates serve as spacers between the main arm 52 and the lever plate 70a and between the sub-arm 53 and the lever plate 70b.

As shown in FIGS. 6 and 9, a bumper anchoring plate member 80 passes through and projects from the enlarged medium portion 73 of the bellcrank lever 70. As clearly shown in FIG. 9, the anchoring plate member 80 has at its middle portion an enlarged section 81 placed between the bellcrank lever plates 70a and 70b and serving as a spacer between the latter. A pair of wing sections 82 of the anchoring plate member 80 pass through respective slots in the lever plates 70a and 70b and project from the surfaces of the latter. The projecting wing sections 82 are fitted thereabout with respective bumpers 83, such as masses of rubber, and respective retainer plates 84 are placed on the bumpers 83. The projecting edges of the wing sections 82 are suitably deformed to form enlarged heads 85 for retaining the retainer plates 84 for the bumpers 83 in position. Thus, the enlarged medium portion 73 of the bellcrank has bumpers fixed to both sides thereof. The retainer plates 84 terminate short of the side edge of each of the bumpers 83 adjacent to the pedal arm 50.

In the assembled condition of the bellcrank lever 70, the second arms 72 thereof pass through an elongated opening 90 (FIG. 3) cut in the front flange 16 of the mounting frame 13, and the first arms 71 project beyond the teeth 39 of the toothed panel 33 of the member 30 on both sides of the panel 33 as shown in FIGS. 1, 5 and 11. The end portions of the first arms 71 carry a pivot pin 93.

Referring to FIGS. 1, 5, 11 and 12, a pivoted pawl member 94 cooperates with the teeth 39 and is pivoted on the pivot pin 93. The pawl member 94 has on one end a pawl tooth engageable with the teeth 39, the other or tail end of the pawl member being pivotally connected to a link consisting of a pair of parallel link members 95 by means of a pin 96. The link members 95 are identical to each other and a pair of spacers 97 are interposed between the link members 95 and the pawl member 94 as shown in FIG. 8. The link members 95 extend in parallel relationship to each other along the outside surfaces of the pedal arm plates 52 and 53, one of the link members 95 passing through an elongated longitudinal slot 98 cut in one flange of the pedal arm plate 53. The free ends of the link members 95 are connected with each other by a link pin 99 which passes through the L-shaped slots 62 previously mentioned. A compression coil spring 100 is at one end thereof anchored to the previously mentioned lug 63 and at another end anchored to the links 95 as shown in FIGS. 1 and 11. Thus, the ends of the links 95 remote from the link pin 99 are always urged toward the lug 63 and therefore the pawl member 94 is also so urged that the pawl tooth thereof may engage the teeth 39 of the sector member 30.

The second arm 72 of the bellcrank lever 70 is suitably connected through a braking force transmitting mechanism 101 to a brake applying device not shown.

The operation of the above explained device will now be described.

FIG. 1 shows a preferred embodiment of the invention in its brake releasing condition. In this releasing condition, the pedal arm 50 is urged to the highest position with the link pin 99 of the links 95 located in the upper right extreme position in the L-shaped slots 62 and with the pawl tooth of the pawl member 94 biased to engage the teeth 39 of the sector member 30 by the force of the spring 100. The upper right extreme position of the link pin 99 is designated by $x$ in FIG. 14.

When it is desired to operate the parking brake, the driver depresses the pedal 51 with foot in the direction of the arrow P. The depression causes the brake pedal arm 50 to swing clockwise about the main pivot pin 25 and at the same time the flanges 52a and 53a of the main arm 52 and sub-arm 53 act upon the bumpers 83 to push the bellcrank lever 70. This causes the bellcrank lever 70 to be forced clockwise with the result that the second arm 72 pulls the brake force transmitting mechanism 101 with an output force W. It will be noted that the depression of the pedal arm 50 has been done by overcoming the force of the return spring 60.

In the course of the clockwise displacement of the pedal arm 50 and the bellcrank lever 70, the pawl member 94 pivotally mounted on the pin 93 of the first lever arms 71 is also moved with the lever arms 71. This can be done because the link pin 99 in the L-shaped slots 62 in the pedal arm 50 is freely movable in and along the slots 62. Since the link pin 99 is free to move, the pawl head biased by the force of the spring 100 may ride over the individual teeth 39 to move from the right hand end of the series of teeth to the left hand end of the same without any substantial resistance. Thus, any desired braking force may be obtained in proportion to the brake pedal depressing stroke S.

In order to maintain the braked condition, it is only necessary to release the foot depression. When the foot depression is released, the pawl tooth is held engaged with the teeth 39 while the pedal arm 50 is moved back counterclockwise a little distance toward the original position by the force of the return spring 60 until the link pin 99 engages the front edges of the L-shaped slots 62 as shown in FIG. 11. The position which the link pin 99 takes in relation to the L-shaped slot 62 at this stage is designated by the reference letter y in FIG. 14. In this condition of FIG. 11, the pawl is resiliently urged toward the teeth 39 because a force is imparted to the pawl member 94 tending to turn the latter counterclockwise about the pin 93, the force being generated by the spring 100 pulling the link 95 toward the lug 63 and by the return spring 60 pulling the links 95 through the link pin 99 and the pedal arm 50. It will be noted that in the condition of FIG. 11 the engagement between the teeth 39 and the pawl is maintained.

To release the brake, the brake pedal arm 50 is again depressed as shown by the arrow P' in FIG. 12. Since the base portion of the pedal arm 50 is spaced apart from the bumpers 83 on the bellcrank lever 70, as shown in FIG. 11, when the pedal arm 50 is depressed again for releasing the brake, the pedal arm 50 does not act immediately upon the bumpers 83. This lost motion when the pedal is depressed allows the link pin 99 to move relative to the L-shaped slots 62 from the position y to the position z as shown in FIGS. 12 and 14. In the condition of FIG. 12 the link pin 99 engages the bottom edges of the L-shaped slots 62 and further depression of the pedal arm 50 causes the link pin 99 and therefore the links 95 to be pushed in the lengthwise direction of the links 95 by the bottom edges of the L-shaped slots 62. This in turn causes the pawl member 94 to be turned clockwise about the pivot pin 93 into the position of FIG. 12 in which the pawl tooth is disengaged from the teeth 39. Thereafter the bellcrank lever 70 is rapidly turned in a counterclockwise direction by the braking mechanism (not shown) and the flanges 52a and 53a of the pedal arm 50 are strongly struck by the bumpers 83 on the bellcrank lever 70 with the result that the pedal arm 50 is driven back to the initial position shown in FIG. 1. In the course of the return of the pedal arm to the initial position, the link pin 99 in the bottom of the L-shaped guide slots 62 engages the guide edge 37 on the extension 36 of the sector member 30 and is guided thereby to return to the original position x shown in FIGS. 1 and 14. Thus, all the members are again in the original position and ready for the next braking operation.

FIGS. 15 and 16 show a modification of the device as already described. The modified device is substantially the same as the former device except that the modified one is arranged with a horizontal arm instead of a generally vertical depending pedal arm adapted to be manually operated. In FIGS. 15 and 16, the members corresponding to those of the former device are designated by the same reference letters as used in FIGS. 1 through 14. In this arrangement the sector member 30 is also directly secured to a frame of the motor vehicle.

While preferred embodiments of this invention have been shown and described, it is to be understood that some modifications of the embodiments may be made within the scope and spirit of the invention as set forth in the following claims.

1. A parking brake control device for motor vehicles comprising:

a stationary sector member having a peripheral arc and including a series of teeth along its peripheral arc;

a stationary main pivot pin supported coaxially with said peripheral arc of said sector member and projecting at a right angle to both sides of said sector member;

an operating arm pivotally mounted on said main pivot pin and swingable in a brake applying or forward direction and in a brake releasing or backward direction;

said operating arm having therein a substantially L-shaped guide slot with one limb thereof extending substantially transversely to the operating arm and with another limb thereof extending from the forward end of said one limb toward the free end of the arm;

a bellcrank lever pivotally carried on said main pivot pin and abutment means rigidly secured on the bellcrank lever and adapted to be engaged and pushed by the forward side edge of said arm when the operating arm is driven forwardly;

a brake force transmitting mechanism, said bellcrank lever including one arm connected to said brake force transmitting mechanism and being adapted to be turned in a brake applying direction when said abutment is pushed by said operating arm;

a pawl member pivotally mounted on the other arm of said bellcrank lever with a pawl tooth on one end;

a link having one end thereof pivotally connected to the other end of said pawl member, and normally biased for the pawl tooth to engage said teeth on said sector member and a pin on the other end of said link which passes through and is slidable along said L-shaped guide slot in said operating arm;

said pin on said link being located in the rear end of the transverse limb of said L-shaped slot when said operating arm is released, and adapted to be freely movable along the transverse limb of said L-shaped slot to allow said pawl to move forwardly riding over the teeth on said sector member when said operating arm is being driven forwardly;

said pin on said link being also adapted to be located in the front end of the transverse limb of said L-shaped slot to maintain said pawl engaged with said teeth when said operating arm is made free after it has been driven forwardly, and adapted to be moved to and engage the radially outermost end of the longitudinal limb of said L-shaped slot, when said operating arm is again driven forwardly, to allow said pawl to be disengaged from said teeth, permitting said operating arm and said bellcrank lever to return backwardly to their original position; and guide means for guiding said pin to cause the same to return to said rear end of said L-shaped slot in the course of return of said operating arm to its original position.

2. The parking brake control device as set forth in claim 1, wherein said guide means is located on said stationary sector member.

3. The parking brake control device as set forth in claim 1, wherein said operating arm is substantially vertically arranged and adapted to be depressed by foot.

4. The parking brake control device as set forth in claim 1, wherein said operating arm is substantially horizontally arranged and adapted to be manually operated.

References Cited

UNITED STATES PATENTS

| | | | |
|---|---|---|---|
| 972,845 | 10/1910 | Fritchle | 74—512 |
| 3,184,992 | 5/1965 | Hinsey et al. | 74—539 |
| 489,456 | 1/1893 | Butler | 74—539 |
| 1,147,670 | 7/1915 | Bassett | 74—512 |
| 1,797,329 | 3/1931 | Constantine | 74—512 |
| 2,479,830 | 8/1949 | Goepfrich | 74—539 |
| 3,079,809 | 3/1963 | Fender et al. | 74—542 |
| 3,216,276 | 11/1965 | Nagy | 74—541 X |
| 3,234,812 | 2/1966 | Fodrea et al. | 74—539 X |

FRED C. MATTERN, Jr., Primary Examiner

C. F. GREEN, Assistant Examiner

U.S. Cl. X.R.

74—575, 599